Figures 1, 2, 3:
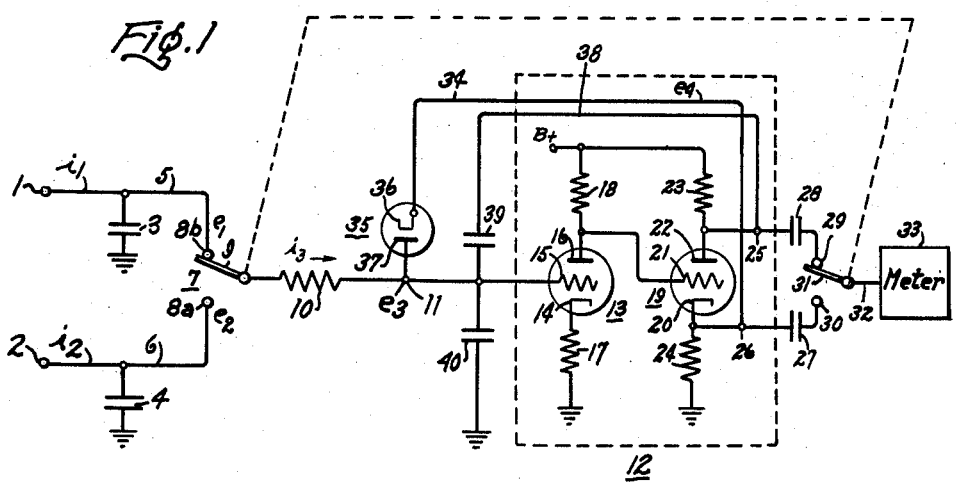

Dec. 8, 1959    J. E. BIGELOW    2,916,702
LOGARITHMIC RATIO METER
Filed Dec. 30, 1955

Inventor
John E. Bigelow
by Merton D. Moore
His Attorney

United States Patent Office 2,916,702
Patented Dec. 8, 1959

2,916,702

LOGARITHMIC RATIO METER

John E. Bigelow, Hales Corners, Wis., assignor to General Electric Company, a corporation of New York Application December 30, 1955, Serial No. 556,709

10 Claims. (Cl. 324—111)

This invention relates to an apparatus for measuring current. More specifically, the invention contemplates an apparatus for obtaining the ratio of two current by means of a logarithmic device.

Many devices have been proposed for the purpose of measuring the ratio of extremely small currents with logarithmic response devices. However, all of the prior art devices utilizing logarithmic elements suffered from two major flaws. First, that a multiplicity of logarithmic devices were necessary, one for each of the currents whose ratio was to be measured. Secondly, those devices which utilized a diode as part of the logarithmic element were susceptible to errors due to diode drift. Diode drift has been defined as a voltage shift of the operating characteristics due to changes in the tube parameters, this drift being normally attributable to changes in the emission characteristics of the cathode.

An object of this invention, therefore, is to provide an apparatus for accurately measuring the ratio of two currents by measuring an output which is proportional to the logarithm of this ratio.

Another object of this invention is to provide an apparatus for measuring the ratio of two currents which utilizes but a single logarithmic element.

A further object of this invention is to provide a measuring instrument utilizing a logarithmic element in which errors due to diode drift are eliminated.

Yet another object of this invention is to provide a logarithmic amplifier in which a degenerative feedback circuit produces a current cancelling the input current, the voltage across said feedback circuit being a logarithmic function of the current therethrough.

Briefly speaking, this invention contemplates an apparatus consisting of two sources of current, the ratio of which is to be determined, each current source being connected to a capacitor which is charged up to a voltage proportional to the current. A synchronous switch periodically discharges the two capacitors through a common resistance element to produce a discharge current having an exponential characteristic. The resistor is connected to the input of a logarithmic amplifier which has two output terminals, one of which produces a signal of the same polarity as the input, while the other produces a signal of the opposite polarity. Connected between the output terminal which produces a signal with a polarity opposite to that of the input and the input terminal of the amplifier is a diode which produces a degenerative current feedback which follows and tends to cancel out the input current. Since the back voltage across a diode is a logarithm of the current flowing therethrough, the voltage across the feedback diode will be a logarithm of the current it is following and tending to cancel. Thus, the output voltage of the amplifier will be a logarithmic function of the input current. The synchronous switch alternately and periodically applies the output signals of opposite polarity to a meter or indicating means to measure the difference of the output voltages. Since the individual output voltages are logarithmic functions of the individual input currents, this voltage difference will represent the ratio of the two input currents. Furthermore, since the two voltages are subtracted and since they are the function of the same diode, any errors due to diode drift are cancelled out and do not affect the output readings.

In an alternative embodiment, this apparatus may be utilized to measure the value of a single fluctuating current rather than the ratio of two varying currents. This is achieved merely by holding one of the input currents constant. Thus, the output voltage will be an indication of the ratio of the varying current to the fixed reference current, and the meter may be calibrated directly in the values of the varying current.

The invention may also be utilized without any storage capacitors, the currents being periodically applied directly to the logarithmic amplifier.

The novel features which I believe to be characteristic of my invention are set forth with particularity in the appended claims. The invention itself, however, both as to its organization and method of operation, together with further objects and advantages thereof, may best be understood by reference to the following description taken in connection with the accompanying drawing, in which Fig. 1 represents an embodiment of this invention;

Fig. 2 discloses curves which represent certain characteristics of its operation, and Fig. 3 represents another embodiment of this invention in which an alternative construction of the input switch is shown.

Referring now to Fig. 1, there is provided a storage circuit for storing a charge due to the currents whose ratio is to be measured, which storage circuit is periodically discharged to produce output currents which are exponential functions of the input current. There are shown a pair of input terminals 1 and 2 which have applied thereto the input currents $i_1$ and $i_2$ whose ratio is to be measured. The terminal 1 is connected by means of a lead 5 to the upper plate of a capacitor 3, the lower plate of which is grounded. Input terminal 2 is connected through a lead 6 to the upper plate of a second capacitor 4, the other plate of which is grounded. A synchronous switch means is provided to discharge the capacitors 3 and 4 periodically. The synchronous switch 7 comprises a pair of contacts 8a and 8b and a vibrating switch member 9 which is oscillated between the contacts 8a and 8b to make electrical contact therewith periodically. The switch 9 is caused to vibrate by means of an exciting winding, which is not shown for the sake of clarity, mounted concentrically about the switch and fed by an alternating current source, the frequency of which determines the frequency of oscillation. Any other suitable arrangement for oscillating the switch 9, may, of course, be utilized. The upper plate of capacitor 3 is connected to the contact 8b by means of lead 5 while the upper plate of capacitor 4 is connected to the contact 8a by the lead 6. The switch 9 is connected to one end of a resistance 10, which provides a discharge path for the capacitors 3 and 4. The other end of the discharge resistance 10 is connected to the input terminal of a two stage amplifier 12, shown within the dashed lines.

The two stage amplifier 12 consists of a directly coupled D.C. amplifier 13 having a cathode 14, a control electrode 15 and an anode 16. A cathode bias resistance 17 is connected between cathode and ground while an anode resistance 18 connects the anode to a source of plate voltage. The output of the D.C. amplifier 13 is directly coupled to the input of a paraphase amplifier 19. The paraphase amplifier consists of an electron discharge device having a cathode 20, a control electrode 21 and an anode 22. A resistance 23 is connected between the anode and a source of plate voltage, while a resistance 24 is connected between cathode and ground. Two output terminals 25 and 26 are respectively connected to the anode 22 and the cathode 20 of the amplifier 19 to provide two output signals of opposite polarity. The output at the terminal 25 is of an opposite polarity with respect to the input to the paraphase amplifier 19 due to tube inversion while the output at terminal 26 is of the same polarity since it is connected to the paraphase amplifier in cathode follower fashion. Since the input to paraphase amplifier 19 has a polarity opposite to that of the input to the D.C. amplifier 13 by virtue of the tube inversion of amplifier 13, it can be seen that the output at terminal 25 is of the same polarity as the input of the D.C. amplifier 13 of the two stage amplifier 12 while the output of terminal 26 is of the opposite polarity.

There is provided a degenerative feedback means between the output and the input of the amplifier to produce a current which tends to cancel out the input current. This feedback means is characterized by the fact that its back voltage is a logarithmic function of the current flowing through it. A diode 35 is connected between the output terminal 26 and the input resistor 10. The cathode 36 of the diode 35 is connected by means of lead 34 to the output terminal 26, while the anode 37 of the diode is connected to an intermediate point 11 between the discharge resistance 10 and the input of D.C. amplifier 13.

In addition, there is also provided a positive feedback means to compensate for any feedback due to the inter-electrode capacity of the diode 35. A capacitance voltage divider, comprising two series-connected capacitors 39 and 40 connected between the output terminal 25, the input terminal, and ground, constitutes the positive feedback means. The intermediate point of the capacitors 39 and 40 is connected to the input of D.C. amplifier 13. The positive feedback produced by the capacitor 39 will cancel any feedback from the negative terminal 26 through the inter-electrode capacity $C_{pk}$ of the diode 35.

The output terminals 25 and 26 of the two stage amplifier 12 are respectively connected through coupling capacitors 27 and 28 to contacts 29 and 30 of a synchronous switch having a vibrating switch member 31 which oscillates between the contacts 29 and 30. The switch member 31 is synchronized with storage means 9 so that the two switches are simultaneously positioned at their upper and lower contacts as shown in Fig. 1 by the dashed line. The synchronization may be achieved by any suitable means. For example, a common exciting coil could be provided for the switches or alternatively separate exciting coils fed from the same alternating voltage source could be provided. The switch 31 is connected by means of leads 32 to a meter or indicating means 33 which will provide a measure of the voltage difference at the contacts 29 and 30. Due to the synchronization between the two oscillating switches, it can be seen when the switch blade 9 is positioned at contact 8b to discharge the capacitor 3, the output switch blade 31 will be at contact 29 to produce an output voltage representative of the current stored in the capacitor 3. Similarly, when switch blade 9 moves to contact 8a, the output switch 31 will have moved to contact 30 to produce an output representative, but opposite in sign, of the current stored in capacitor 4. Thus, the output to the indicating means is alternately applied from the two output contacts 29 and 30.

The operation of the apparatus is most easily understood by reference to Fig. 2 which shows voltage and current relations at various points within the circuit plotted against switch position. With the switch member 9 in the down position, the current $i_1$ applied to the terminal charges the input capacity 3 so that its voltage $e_1$ rises linearly, as is illustrated in part 1 of Fig. 2. At some time later, the switch 9 moves from the down position and comes into contact with the upper contact 8b which discharges the capacitor 3 through the resistance 10 and causes its voltage to decay exponentially. The discharge of capacitor 3 causes an exponentially decaying current $i_3$ as shown by the dashed line portion of part 2, to flow through the discharge resistor 10, the peak amplitude of which is proportional to $i_1$. The exponential character of the current $i_3$ represents the normal characteristic of a capacitance being discharged through a resistance. Since the discharge resistance 10 is coupled to the input of the amplifier 12 there will appear at the two output terminals of the amplifier 12 an instantaneous signal which is representative of the input. As pointed out before, the output at the terminal 26 will be of a polarity opposite to that of the input while the output at the terminal 25 will be of a polarity which is the same as the input. The output voltage at the terminal 26 will cause a feedback current to flow through the diode 35. Since the voltage at terminal 26 is of a polarity opposite to the input signal, the feedback current through the diode 35 will tend to oppose and cancel out the discharge current $i_3$. As a result, the voltage $e_3$ at the junction of the resistance 10 and the anode 37 of the diode will be kept very near zero.

It is a well-known fact that the back voltage across a diode is a logarithmic function of the current flowing therethrough. Thus if diode 35 produces a feedback current, the back voltage $e_4$ across the diode is the logarithm of that current. The feedback current in the instant case opposes and cancels out a current $i_3$ which has an exponential characteristic. It can be seen, therefore, that the wave shape of the diode feedback current will also be exponential in nature. As a consequence the back voltage $e_4$ will be a logarithmic function of this exponential current and will decrease in a linear fashion since the logarithm of an exponential function is linear. Thus, during an exponential decay of $i_3$, $e_4$ falls linearly and represents the logarithm of $i_3$. The output switch member 31 being synchronized with the switch blade 9 will, during the period when capacitor 3 is discharging, be at the contact 29 and thus the output voltage $e_6$ will follow the linear fall of the diode back voltage $e_4$ as is shown in part 2 of Fig. 2.

While the switches were in the up position, the current $i_2$ applied to the terminal 2 has been charging the capacitor 4 to a voltage $e_2$ in a fashion similar to that of capacitor 3. When the switch blade 9 comes into the down position and moves against contact 8a the capacitor 4 is discharged, as shown in portion 3 of Fig. 2, and an exponential discharge current $i_3$ again flows through the resistance 10, with a peak value proportional to $i_2$ as in the first case it was proportional to $i_1$. The diode 35 again produces a feedback current which opposes and tends to cancel out $i_3$ and because of the logarithmic relationship between diode current and diode back voltage, the voltage $e_4$ falls linearly but is displaced vertically from the $e_4$ shown in part 2 of Fig. 2. The amount of displacement of $e_4$ is proportional to the relative peak values of $i_3$ for the two positions of the switch 9. That is, with the switch 9 in the down position the peak value of $i_3$ is proportional to $i_2$ as the peak value of $i_3$ with the contacts in the up position was proportional to $i_1$. Since, as pointed out above, $e_4$ represents a logarithmic function of $i_3$, the peak values of $e_4$ for the two switch positions are representative of the relative values of $i_3$, and in turn of $i_1$ and $i_2$, and their relative displacement is proportional to the ratio of $i_1$ to $i_2$. Since the contacts at the output of the amplifier operate in synchronism with those in the discharge path, the switch blade 31 has moved to the contact 30 and the output voltage $e_6$ is not the same as $e_4$ but is the negative thereof since, as pointed out before, output terminal 25 which is connected to contact 29 produces the negative of the voltage to be found at the terminal 26. As shown in portion 3 of Fig. 2, $e_4$ is shown in the upper portion of the figure while $e_6$, the output voltage, is of the same magnitude and same characteristic but is in the negative direction. Thus, the indicating means 33 has applied to it alternately two voltages of opposite sign, the amplitudes of which represent the magnitudes of the input currents. Algebraically adding these voltages will produce a resultant voltage which is equal to the difference of the amplitudes of these two voltages. Since these voltages are a logarithmic function of the input current, as explained above, the difference voltage produced will be proportional to the ratio of the input currents since subtracting the logarithms of these two numbers is equivalent to dividing the numbers themselves.

Furthermore, any errors in the individual output voltages due to diode drift will be cancelled out and thus not affect the output reading, since the output voltages representing the currents whose ratio is to be determined are made of opposite polarity and are algebraically added.

Although the embodiment of Fig. 1 shows the storage capacitors as physically distinct elements, it is possible, when extremely small currents are being measured, to utilize the stray capacity to a ground of leads 5 and 6 to store the charge representing the currents $i_1$ and $i_2$. In this fashion the circuit can be simplified by the elimination of the capacitors 3 and 4.

The apparatus, as described above, has been utilized to determine the ratio of two continuously varying currents. However, it is obvious that this apparatus may be used to measure the value of a single varying current without changing the character of its construction. This can be achieved by making one of the input currents constant while the one to be measured varies. Thus, the ratio of the two currents in the output would be the ratio of a continuously varying current to a fixed current. It seems clear, therefore, that this ratio represents the variation of but a single current and the output measuring of indicating means may be calibrated to indicate this ratio merely as the variation of the one current.

In an alternative embodiment of the invention it is possible to measure the ratio of two currents without utilizing storage capacitors of any sort.

Referring now to Fig. 3, there are shown a pair of input terminals 41 and 42 to which the input currents $i_1$ and $i_2$ are applied. There is provided a pair of input switches for alternately applying each input current to the logarithmic amplifier and to ground. Terminal 41 is connected by means of lead 43 to contacts 45 and 49 of synchronous switches 44 and 48 respectively—switch 44, in addition to contact 45, consists of a second contact 46 and a vibrating member 47 which is grounded. Switch 48, in addition to contact 49, consists of a second contact 50 and a vibrating member 51 which is connected to the input of the logarithmic amplifier. Contact 50 is connected to current terminal 42 by means of lead 53 and to contact 46 of switch 44 by the lead 52.

The operation of Fig. 3 may be described as follows: with the vibrating members 47 and 51 in the upper position, $i_1$ flows through lead 43, contact 49 and vibrating member 51 into the logarithmic amplifier, while $i_2$ flows through leads 44 and 52 to contact 47 and then to ground through vibrating switch 47. Thus, with the vibrating members in the up position, $i_1$ is applied to the amplifier. With the vibrating members in the down position, $i_1$ flows to ground through the lead 43, contact 45 and vibrating member 47 which is now positioned against contact 45. On the other hand $i_2$ is applied to the logarithmic amplifier through lead 44, contact 50 and vibrating member 51 which is now positioned against contact 50. It can be seen that the currents $i_1$ and $i_2$ are periodically and alternately applied to the input of the logarithmic amplifier thus obtaining a ratio of the two currents in the output.

While I have shown a particular embodiment of my invention, it will, of course, be understood that I am not limited thereto since my modifications, both in the circuit arrangement and in the instrumentalities employed, may be made. I contemplate by the appended claims to cover any such modifications as fall within the true spirit and scope of my invention.

What I claim as new and desire to secure by Letters Patent of the United States is:

1. A device for measuring the ratio of two currents, comprising storage charges proportional to the means for separately storing two currents, switch means coupled to said storage means for alternately discharging said storage means to produce two individual input currents, said switch means also being coupled to the input of a logarithmic means having an output circuit so that electrical outputs appearing at said output circuit are a logarithmic function of the input current, said logarithmic means including a degenerative feedback means whereby a degenerative feedback current is produced which is substantially equal to said input currents, means for measuring the difference of the electrical outputs coupled to the outputs of said logarithmic means in synchronism with said switch means whereby a measure of the ratio of the two currents is obtained.

2. A device for measuring the ratio of two currents, comprising a first capacitor to be charged by a first current, a second capacitor to be charged in accordance with a second current, switch means coupled to said first and second capacitors for alternately discharging them, logarithmic means, including a degenerative feedback means, coupled to said switch means, said logarithmic means producing electrical outputs of opposite polarity which are the logarithmic functions of the input current, and means for measuring the difference of the electrical outputs coupled to the outputs of said logarithmic means in synchronism with said switch means whereby a measure of the ratio of the two currents is obtained.

3. The apparatus according to claim 2 in which the first current is continuously variable and the second current is constant.

4. A device for measuring the ratio of two currents, comprising a logarithmic device having an output circuit for producing electrical output signals of opposite polarity which are logarithmic functions of the input current including a degenerative feedback means to generate a feedback current which is opposite and substantially equal to the input current, a first current input terminal, a second current input terminal, switch means for alternately coupling said terminals to the logarithmic device and to ground, means for measuring the difference of the outputs of said logarithmic device whereby a measure of the ratio of the two currents is obtained.

5. The apparatus according to claim 4 in which the switch means comprises a first pair of contacts coupled to said first current input terminal, a second pair of contacts coupled to said second current input terminal, a first vibrating member adapted to move between one contact of each of said first and second pair of contacts, a second vibrating member adapted to move between the other contact of said first and second pair of contacts, said first vibrating member being coupled to ground and said second vibrating member being coupled to the logarithmic device.

6. A device for measuring the ratio of two currents, comprising a logarithmic means having an input terminal and a pair of output terminals for a pair of outputs of opposite polarity which are logarithmic functions of an input current, means coupled to said input terminal for alternately applying thereto two currents whose ratio is to be determined, measuring means alternately coupled to individual ones of the respective output terminals in synchronism with individual ones of said input currents applied to said input terminal, whereby the difference of said outputs is obtained representing the ratio of said currents.

7. A device for measuring the ratio of two currents, comprising a single logarithmic means having an input terminal and a pair of output terminals representing opposite polarities, said single logarithmic means including a degenerative feedback means, whereby said device produces a pair of outputs of opposite polarity which are logarithmic functions of an input current, measuring means, synchronous means alternately coupling two currents to said input terminal and said measuring means to the respective output terminals in synchronism with the input currents, whereby the difference of said outputs is obtained representing the ratio of said currents.

8. A device for measuring the ratio of two currents, comprising a logarithmic means having an input terminal and a pair of output terminals representing opposite polarities, and including a degenerative feedback means the voltage thereacross being a logarithmic function of the current flowing therethrough, means coupled to said input terminal for alternately applying thereto two currents whose ratio is to be determined, measuring means successively coupled to the respective output terminals in synchronism with the currents applied to the input terminal whereby the difference of said outputs is obtained representing the ratio of said currents.

9. In an apparatus for determining the ratio of two electrical signals, the combination comprising a logarithmic means having an input terminal and producing a pair of electrical outputs of opposite polarity for each input signal which are logarithmically related to an input signal applied to said input terminal, means for algebraically adding said electrical outputs, and means for applying a pair of electrical signals the ratio of which is to be determined alternately to said input terminal while simultaneously applying an output of one polarity to said algebraic means when one of said signals is applied to said input terminal and the output of the opposite polarity when the other of said signals is applied to said input terminal whereby the difference of said electrical output is obtained representing the ratio of said input signals.

10. A device for measuring the ratio of two currents comprising storage means for individually storing charges proportional to two currents, logarithmic means having an input circuit and an output circuit, said output circuit including a plurality of output terminals, the electrical outputs appearing at the output terminals of said outputs circuit being the logarithmic function of said input current, means coupled to the storage means and the logarithmic means for periodically coupling said storage means to the input of said logarithmic device to apply thereto alternately currents proportional to the charges stored in said storage means, means for measuring the difference of the electrical output appearing at said output terminals, said last named means being coupled alternately to the output terminals of said logarithmic device in synchronism with said means for coupling said storage means to said input whereby a measure of the ratio of said two currents is obtained.

References Cited in the file of this patent

UNITED STATES PATENTS

| | | |
|---|---|---|
| 2,244,369 | Martin | June 3, 1941 |
| 2,353,672 | Keck et al. | July 18, 1944 |
| 2,647,236 | Saunderson et al. | July 28, 1953 |
| 2,728,862 | de Bourgknecht | Dec. 27, 1955 |
| 2,761,350 | Horning | Sept. 4, 1956 |

FOREIGN PATENTS

| | | |
|---|---|---|
| 914,756 | Germany | July 8, 1954 |

OTHER REFERENCES de Shong, Electronics, March 1954, pages 190 and 191.